(12) United States Patent
Wang

(10) Patent No.: US 10,121,300 B2
(45) Date of Patent: *Nov. 6, 2018

(54) ELECTRIC LOCK DEVICE AND DOOR INCLUDING THE SAME

(71) Applicant: Yu-Chi Wang, Taipei (TW)

(72) Inventor: Yu-Chi Wang, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,691

(22) Filed: Feb. 27, 2017

(65) Prior Publication Data

US 2017/0169642 A1     Jun. 15, 2017

Related U.S. Application Data

(63) Continuation of application No. 14/955,263, filed on Dec. 1, 2015, now Pat. No. 9,728,026.

(30) Foreign Application Priority Data

May 14, 2015   (TW) .............................. 104115391 A

(51) Int. Cl.
  *G05B 19/00*   (2006.01)
  *G07C 9/00*    (2006.01)
  *G06K 9/00*    (2006.01)

(52) U.S. Cl.
  CPC ..... *G07C 9/00563* (2013.01); *G07C 9/00309* (2013.01); *G06K 9/00087* (2013.01);
  (Continued)

(58) Field of Classification Search
  CPC ............ G07C 9/00563; G07C 9/00309; G07C 2009/00341; G07C 2009/0065; G06K 9/00087; G06K 9/00288
  (Continued)

(56) References Cited

U.S. PATENT DOCUMENTS

| | | | |
|---|---|---|---|
| 5,754,107 A | 5/1998 | Ferrantelli | |
| 2007/0096870 A1* | 5/2007 | Fisher | E05B 19/0005 340/5.53 |

(Continued)

FOREIGN PATENT DOCUMENTS

| | | |
|---|---|---|
| CN | 103184818 A | 7/2012 |
| TW | M455052 U1 | 6/2013 |

(Continued)

OTHER PUBLICATIONS

Search Report appended to an Office Action, issued in Taiwanese counterpart application No. 104115391, dated Mar. 22, 2016, and corresponding English translation.

*Primary Examiner* — Dhaval Patel
(74) *Attorney, Agent, or Firm* — Hamre, Schumann, Mueller & Larson, P.C.

(57) ABSTRACT

A door includes a door panel and an electric lock device including a solar energy module, a biometric verification module, a control module and an electric lock. The solar energy module converts solar energy into an electricity output. The biometric verification module receives a biometric input signal relative to a biometric feature, determines whether the biometric feature conforms with a set of pre-established data, and generates a conforming signal if the determination is affirmative. The control module receives the conforming signal to generate a control signal and an unlocking signal. The electric lock receives the control signal and the unlocking signal. The electric lock operates to unlock the door panel.

18 Claims, 2 Drawing Sheets

(52) U.S. Cl.
CPC . *G06K 9/00288* (2013.01); *G07C 2009/0065* (2013.01); *G07C 2009/00341* (2013.01)

(58) Field of Classification Search
USPC .......... 340/5.52, 5.51, 5.53, 12.5, 5.25, 901, 340/5.82, 5.61, 438, 5.2, 539.1, 5.3, 340/573.4, 542, 545.1; 701/2, 93
See application file for complete search history.

(56) References Cited

U.S. PATENT DOCUMENTS

| | | |
|---|---|---|
| 2009/0273440 A1 | 11/2009 | Marschalek et al. |
| 2011/0251876 A1* | 10/2011 | Fisher .................... G06Q 10/08 705/7.32 |
| 2013/0000366 A1 | 1/2013 | Martel et al. |
| 2016/0063853 A1 | 3/2016 | Mi |
| 2016/0306062 A1* | 10/2016 | Keene .................. G01R 33/288 |
| 2017/0332055 A1* | 11/2017 | Henderson ............. H04N 7/186 |

FOREIGN PATENT DOCUMENTS

| | | |
|---|---|---|
| TW | I458883 | 11/2014 |
| TW | M497691 U | 3/2015 |

* cited by examiner

ELECTRIC LOCK DEVICE AND DOOR INCLUDING THE SAME

CROSS-REFERENCE TO RELATED APPLICATION

This application is a continuation application of U.S. patent application Ser. No. 14/955,263, which is filed on Dec. 1, 2015 and which claims priority of Taiwanese Application No. 104115391, filed on May 14, 2015.

FIELD

The disclosure relates to a door and an electric lock device of the same, and more particularly to an electric lock device using solar energy as electrical energy source thereof.

BACKGROUND

A conventional electric lock device of a door is user-operable to unlock the door by recognizing a fingerprint of a user or by verifying a password inputted by the user. Since a physical key is not required for operating the conventional electric lock device, it is convenient to e user and is relatively safe. However, the conventional electric lock device uses the mains electricity as electrical energy source thereof, and is not environment-friendly.

SUMMARY

Therefore, an object of the disclosure is to provide a door and an electric lock device that can alleviate at least one of the drawbacks of the prior arts.

According to one aspect of the disclosure, a door includes a door panel and an electric lock device. The door panel has two opposite sides. The electric lock device is mounted to the door panel, and includes a solar energy module, a biometric verification module, a control module and an electric lock. The solar energy module is disposed at one of the sides of the door panel, and is configured to convert solar energy into an electricity output. The biometric verification module is disposed at the one of the sides of the door panel, and is configured to receive a biometric input signal relative to a biometric feature, to determine whether the biometric feature conforms with a set of pre-established data. When it is determined that the biometric feature conforms with the set of pre-established data, the biometric verification module generates a conforming signal. The control module is electrically coupled to the solar energy module and the biometric verification module, and is configured to measure the electricity output from the solar energy module, to receive the conforming signal from the biometric verification module, and to generate a control signal when a measurement of the electricity output is greater than a threshold value. The control module is capable of generating an unlocking signal according to the conforming signal. The electric lock has a keyhole and a blocking member. The electric lock is disposed at the one of the sides of the door panel. The electric lock is electrically coupled to the control module for receiving the control signal and the unlocking signal. In response to receipt of the control signal, the electric lock is configured to operate in an electric control mode. In the electric control mode, the blocking member covers the keyhole, and the electric lock operates to unlock the door panel when receiving the unlocking signal. In response to the absence of the control signal, the electric lock is configured to operate in a manual mode. In the manual mode, the blocking member exposes the keyhole and the electric lock is manually operable to lock and unlock the door panel.

An electric lock device according to another aspect of the disclosure is configured to be mounted to a door panel that has two opposite sides. The electric lock device includes a solar energy module, a biometric verification module, a control module and an electric lock. The solar energy module is adapted to be disposed at one of the sides of the door panel, and is configured to convert solar energy into an electricity output. The biometric verification module is adapted to be disposed at the one of the sides of the door panel. The biometric verification module is configured to receive a biometric input signal relative to a biometric feature, to determine whether the biometric feature conforms with a set of pre-established data, and to generate a conforming signal when it is determined that the biometric feature conforms with the set of pre-established data. The control module is electrically coupled to the solar energy module and the biometric verification module, and is configured to measure the electricity output from the solar energy module, to receive the conforming signal from the biometric verification module, and to generate a control signal when a measurement of the electricity output is greater than a threshold value. The control module is capable of generating an unlocking signal according to the conforming signal. The electric lock has a keyhole and a blocking member. The electric lock is adapted to be disposed at the one of the side of the door panel, and is electrically coupled to the control module for receiving the control signal and the unlocking signal. In response to receipt of the control signal, the electric lock is configured to operate in an electric control mode. In the electric control mode, the blocking member covers the keyhole, and the electric lock operates to unlock the door panel when receiving the unlocking signal. In response to the absence of the control signal, the electric lock is configured to operate in a manual mode. In the manual mode, the blocking member exposes the keyhole and the electric lock is manually operable to lock and unlock the door panel.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
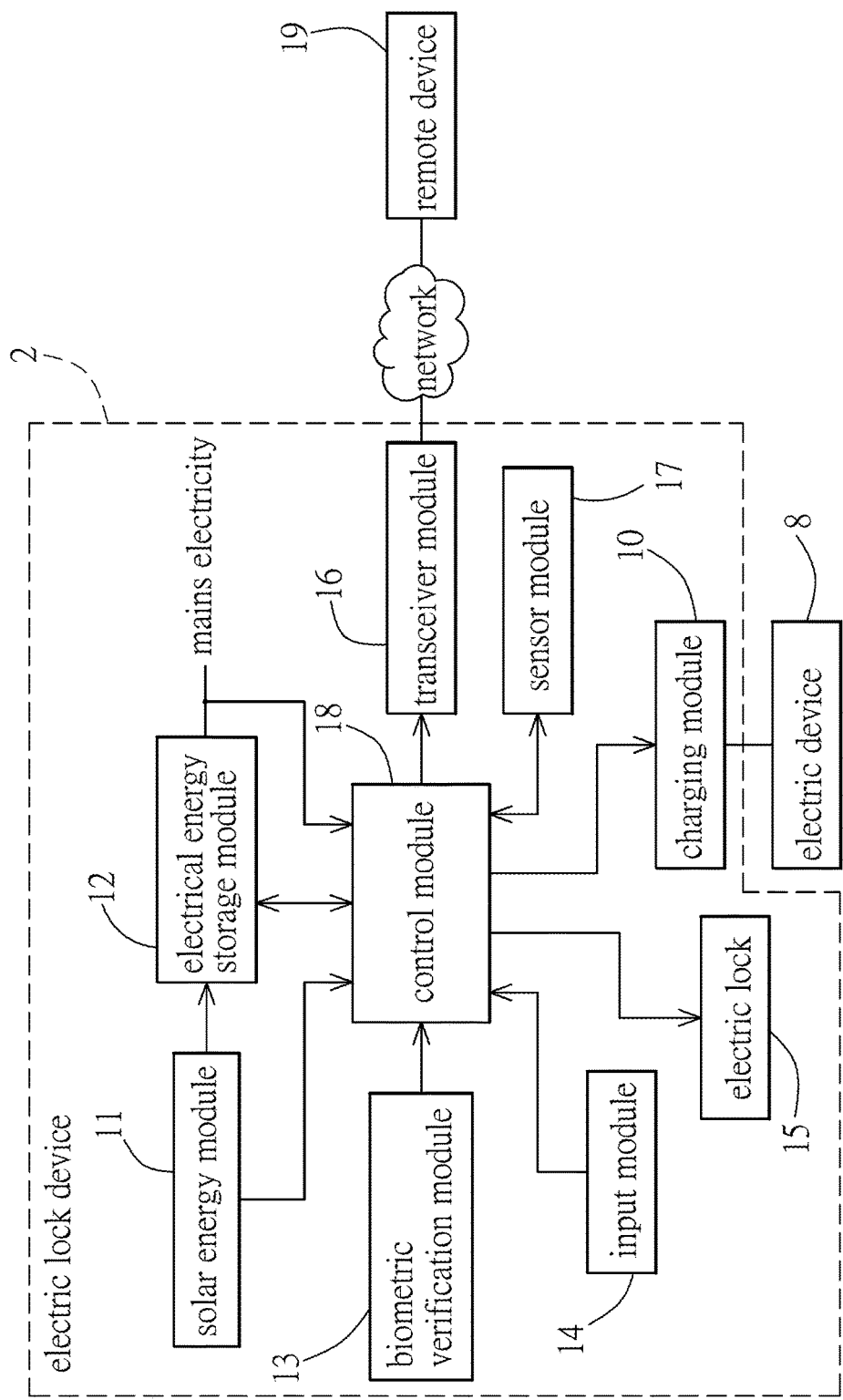
FIG. 1 is a schematic block diagram of an embodiment of an electric lock device according to the disclosure.
Figure 2:
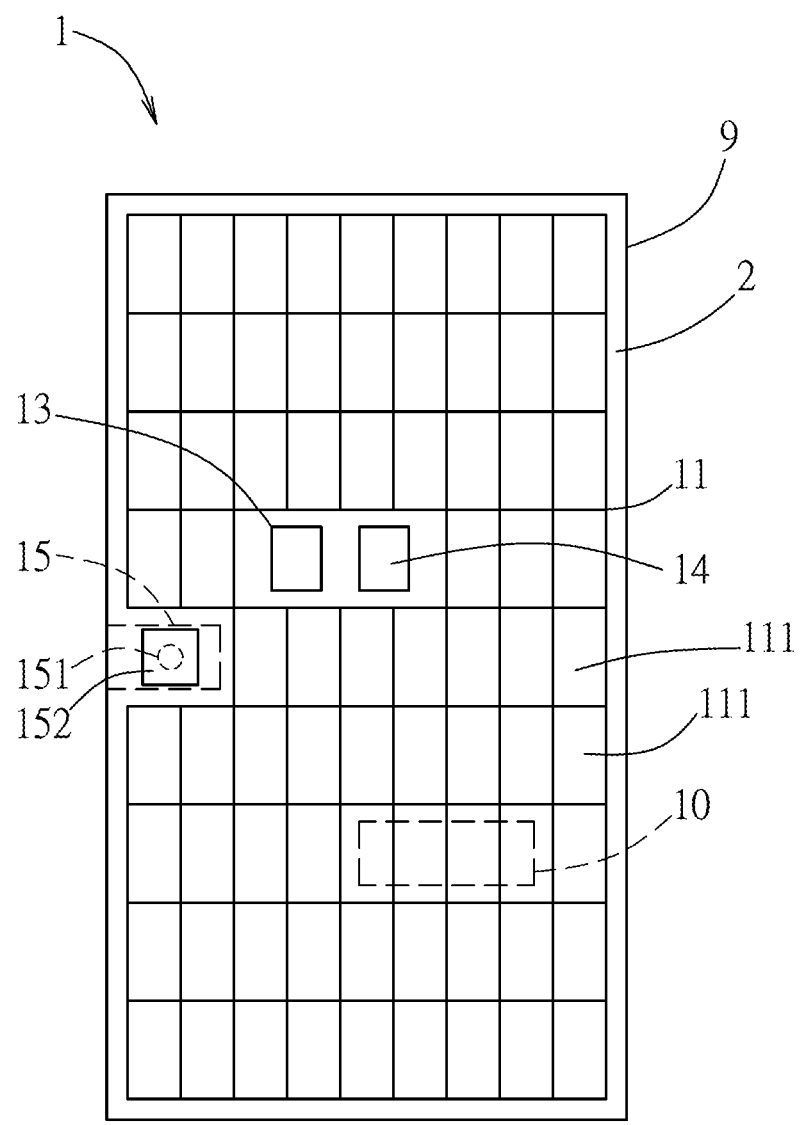
FIG. 2 is a schematic diagram of an embodiment of a door provided with the electric lock device according to the disclosure.

Referring to FIGS. 1 and 2, the embodiment of a door 1 according to this disclosure includes a door panel 9 and an electric lock device 2. The door panel 9 has two opposite sides (i.e., an inner side and an outer side). The electric lock device 2 is mounted to the door panel 9, and includes a charging module 10, a solar energy module 11, an electrical energy storage module 12, a biometric verification module 13, an input module 14, an electric lock 15, a transceiver module 16, a sensor module 17 and a control module 18.

The transceiver module 16 is electrically coupled to the control module 18, and is configured to communicate with a remote device 19 through a network. For example, the transceiver module 16 and the remote device 19 support one of Bluetooth®, Wi-Fi, the third generation of mobile telecommunications technology (3G), and the fourth generation of mobile telecommunications technology (4G). The remote device 19 is, but not limited to, a cell phone, a smart phone, or any electronic device capable of communication with the transceiver module 16.

The solar energy module 11 is disposed at one of the sides of the door panel 9, and is configured to convert solar energy into an electricity output. In this embodiment, the solar energy module 11 includes a plurality of solar panels 111 disposed at, for example, the outer side of the door panel 9 for receiving sunlight as the solar energy so as to convert the solar energy into the electricity output.

The electrical energy storage module 12 is electrically coupled to the solar energy module 11 and the control module 18. The electrical energy storage module 12 is controlled by the control module 18 to store one of mains electricity and the electricity output of the solar energy module 11. The electrical energy storage module 12 is configured to provide electrical energy stored therein as an electrical power source of the electric lock device 2. Namely, the electrical energy storage module 12 serves as an electric power source of the biometric verification module 13, the input module 14, the electric lock 15, the transceiver module 16, the sensor module 17 and the control module 18.

The biometric verification module 13 is disposed at the one of the sides of the door panel 9. The biometric verification module 13 is configured to receive a biometric input signal relative to a biometric feature of a user, to determine whether the biometric feature conforms with a set of pre-established data, and to generate a conforming signal when it is determined that the biometric feature conforms with the set of pre-established data. In this embodiment, the biometric verification module 13 is a fingerprint reader, and the biometric input signal is relative to biometric features of a fingerprint or a palm print of the user. The set of pre-established data is pre-stored in the biometric verification module 13, and is relative to a set of fingerprint or palm print features of a specific person. For example, when the biometric verification module 13 determines that the biometric feature of the user conforms with the set of fingerprint features of the specific person, the biometric verification module 13 generates the conforming signal.

In other embodiments, the biometric verification module 13 may be a facial recognition device, the biometric input signal is relative to biometric features of a face of the user, and the set of pre-established data is relative to a set of facial features of a face of the specific person. Certainly, the biometric verification module 13 may be a combination of the fingerprint reader and the facial recognition device.

The input module 14 is disposed at the one of the sides of the door panel 9, is electrically coupled to the control module 18, and is configured to receive a user input of a verification input signal indicative of an input code and to transmit the verification input signal to the control module 18. For example, the input module 14 is, but not limited to, a numeric keypad, a touch panel, a voice input device, etc.

The control module 18 is electrically coupled to the solar energy module 11, the electrical energy storage module 12 and the mains electricity, and is configured to measure the electricity output from the solar energy module 11, the electrical energy stored in the electrical energy storage module 12 and the mains electricity. The control module 18 controls the electrical energy storage module 12 to store the electricity output from the solar energy module 11 as the electrical energy when the measurement of the electricity output is greater than a threshold value, and to store the mains electricity as the electrical energy when the measurement of the electricity output is smaller than the threshold value and the measurement of the mains electricity is greater than the threshold value. For each of the electricity output, the electrical energy and the mains electricity, the measurement is magnitude of a current or a voltage thereof. For example, the threshold value is a minimum current or a minimum voltage that is sufficient to electrically operate the electric lock device 2. In other embodiments, the electrical energy storage module 12 may be omitted, and the electric lock device 2 only uses the electricity output from the solar energy module 11 and the mains electricity as the electric power source. In another embodiment, the electric lock device 2 may operate without use of the mains electricity, and only uses the electricity output and the electrical energy stored in the electrical energy storage module 12 as the electric power source. In yet another embodiment, the electrical energy storage module 12 and the mains electricity may be omitted, and the electric lock device 2 only uses the electricity output as the electric power source.

The control module 18 generates a control signal when the measurement of any one of the electricity output, the mains electricity and the electrical energy is greater than the threshold value. The electric lock 15 is electrically coupled to the control module 18 for receiving the control signal therefrom, and is configured to operate in an electric control mode in response to receipt of the control signal.

When each of the measurements respectively of the electricity output, the mains electricity and the electrical energy is smaller than the threshold value, the control module 18 generates a first warning signal and transmits the first warning signal to the remote device 19 through the transceiver module 16. Moreover, the control module 18 is further configured to monitor operation status of the solar energy module 11, and to transmit the operation status of the solar energy module 11 to the remote device 19 through the transceiver module 16.

The control module 18 is further electrically coupled to the biometric verification module 13 for receiving the conforming signal therefrom. In response to receipt of the conforming signal, the control module 18 generates a verification code, transmits the verification code to the remote device 19, and generates an unlocking signal when the input code indicated by the verification input signal received from the input module 14 conforms with the verification code. In this embodiment, the control module 18 fetches from the biometric verification module 13 the biometric feature in the biometric input signal and the set of pre-established data to which the biometric feature conforms in response to receipt of the conforming signal, and generates the verification code according to a predefined formula based on one of the measurement of the electricity output of the solar energy module 11, a first parameter relative to the biometric feature, current time, a second parameter relative to the set of pre-established data, and a combination thereof.

For example, the biometric verification module 13 pre-stores a plurality of sets of pre-established data corresponding to a household having multiple members, and each set of pre-established data specifically corresponds to a respective member of the household. The control module 18 pre-stores a lookup table that records a plurality of sets of contact information (e.g., a telephone number, an email address, etc.) associated with the members of the household, respectively.

In particular, upon verifying that the biometric feature of the user who wants to open the door 1 conforms with the fingerprint features (i.e., the set of pre-established data)

corresponding to a first one of the members of the household, the biometric verification module 13 generates the conforming signal and transmits the same to the control module 18. When the control module 18 receives the conforming signal and generates the control signal upon determining that the measurement of any one of the electricity output, the mains electricity and the electrical energy is greater than the threshold value (i.e., the electric lock 15 operates in the electric control mode), the control module 18 generates the verification code, and transmits the verification code to the remote device 19 through the transceiver module 16 according to the set of contact information in the lookup table that is associated with the first one of the members. The remote device 19 is, for example, a cell phone associated with the telephone number of the first one of the members. The user holding the remote device 19 is thus aware of the verification code from the remote device 19, and inputs the verification code as the input code through the input module 14. Then, the input module 14 generates the verification input signal indicating the input code, and transmits the verification input signal to the control module 18. When it is determined that the input code is identical to the verification code, the control module 18 generates the unlocking signal and transmits the unlocking signal to the electric lock 15. The electric lock 15 operating in the electric control mode operates to unlock the door panel 9 upon receiving the unlocking signal from the control module 18.

In this embodiment, the biometric verification module 13, the input module 14 and the control module 18 cooperate together in order to provide dual security of biometric verification and password verification. In other embodiments, the password verification may be omitted, in which case the input module 14 is omitted accordingly, and the control module 18 directly generates and transmits the unlocking signal upon receiving the conforming signal from the biometric verification module 13 without generating the verification code.

The electric lock 15 has a keyhole 151 and a blocking member 152 that are disposed at the one of the sides of the door panel 9. In the electric control mode (i.e., there is sufficient electricity to electrically operate the electric lock 15 from any one of the electricity output of the solar energy module 11, the mains electricity and the electrical energy of the electrical energy storage module 12), the blocking member 152 covers the keyhole 151, and the electric lock normally locks the door panel 9, and operates to unlock the door panel 9 when receiving the unlocking signal. In response to absence of the control signal (i.e., none of the solar energy module 11, the mains electricity and the electrical energy storage module 12 can provide sufficient electricity for driving electrical operation of the electric lock 15), the electric lock 15 operates in a manual mode, in which the blocking member 152 exposes the keyhole 151 and the electric lock 15 is manually operable to lock and unlock the door panel 9. In the manual mode, the user can use a particular key that is compatible with the keyhole 151 for operating the electric lock 15 to lock and unlock the door panel 9. In particular, a biasing force provided by, for example, a spring is normally applied to the blocking member 152, and the electric lock 15 further has a driving member (not shown) that is operable in the electric control mode to convert the electricity into mechanical energy for urging the blocking member 152 to counteract the biasing force and to keep the blocking member 152 at a first position covering the keyhole 151. In the manual mode, the electricity provided to the electric lock 15 is insufficient, and the driving member cannot output the mechanical energy, such that the blocking member 152 is driven by the biasing force to move to a second position exposing the keyhole 151.

The sensor module 17 is electrically coupled to the control module 18, and is configured to measure an external force applied on the electric lock 15 and to transmit a degree of the external force to the control module 18. The control module 18 is further configured to determine whether the degree of the external force is greater than a threshold degree. When it is determined that the degree of the external force is greater than the threshold degree, the control module 18 generates a second warning signal and transmits the second warning signal to the remote device 19 through the transceiver module 16. In this embodiment, the sensor module 17 measures the external force applied, for example, to the blocking member 152 or the keyhole 151. In other embodiments, the sensor module 17 may sense and measure the external force applied to the door panel 9, the solar energy module 11, the input module 14, and/or the biometric verification module 13.

In addition, the control module 18 may transmit the first and the second warning signal selectively to a remote device that is associated with a particular member according to the lookup table. For example, the control module 18 transmits the first warning signal to a remote device associated with a member who is assigned as an administrator through the transceiver module 16 when the measurements respectively of the electricity output, the mains electricity, and the electrical energy stored in the electrical energy storage module 12 are all smaller than the threshold value. The control module 18 transmit the second warning signal to a remote device associated with a security service personnel and/or a remote device associated with a particular member of the household when, for example, a thief is trying to break the door panel 9 by applying an external force to the door panel 9, such that the degree of the external force which is measured by the sensor module 17 as determined by the control module 18 is greater than the threshold degree.

The charging module 10 is electrically coupled to the control module 18. The charging module 10 allows an electric device 8 to be electrically connected thereto. In detail, when it is determined that the measurement of the electrical energy stored in the electrical energy storage module 12 is greater than a predetermined value, the control module 18 provides the electrical energy from the electrical energy storage module 12 to the charging module 10 for charging the electrical device 8. On the other hand, when it is determined that the measurement of the electrical energy is smaller than the predetermined value, the control module 18 prevents transmission of the electrical energy from the electrical energy storage module 12 to the charging module 10. In this embodiment, the charging module 10 includes a universal serial bus (USB) interface (not shown) disposed at another one of the sides of the door panel 9 (i.e., the inner side). The electric device 8 is, for example, a smart phone provided with a USB interface. The predetermined value is half the value of the full capacity of the electrical energy storage module 12. In other embodiments, the charging module 10 is integrated with the electrical energy storage module 12, and the USB interface is electrically connected to the electrical energy storage module 12 and is disposed at the inner side of the door panel 9. The predetermined value is adjustable according to different requirements.

In sum, by virtue of the solar energy module 11, the electric lock device 2 is environment-friendly. Further, the biometric verification module 13, the input module 14 and the control module 18 cooperate together to provide dual security of the biometric verification and the password verification, such that the security of the electric lock device 2 is enhanced.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A door comprising:
a door panel that has two opposite sides; and
an electric lock device that is mounted to said door panel, and that includes
a solar energy module disposed at one of said sides of said door panel, and configured to convert solar energy into an electricity output,
a biometric verification module disposed at said one of said sides of said door panel, and configured to receive a biometric input signal relative to a biometric feature, to determine whether the biometric feature conforms with a set of pre-established data, and to generate a conforming signal when it is determined that the biometric feature conforms with the set of pre-established data,
a control module electrically coupled to said solar energy module and said biometric verification module, and configured to measure the electricity output from said solar energy module, to receive the conforming signal from said biometric verification module, and to generate a control signal when a measurement of the electricity output is greater than a threshold value, said control module being capable of generating an unlocking signal according to the conforming signal,
an electrical energy storage module electrically coupled to said solar energy module and said control module, and configured to store electrical energy from one of mains electricity and the electricity output of said solar energy module, and to provide the electrical energy stored therein as an electrical power source of said electric lock device, and
an electric lock having a keyhole and a blocking member that are disposed at said one of said sides of said door panel, and electrically coupled to said control module for receiving the control signal and the unlocking signal, said electric lock being configured to
operate, in response to receipt of the control signal, in an electric control mode, in which said blocking member covers said keyhole, and said electric lock operates to unlock said door panel when receiving the unlocking signal, and
operate, in response to the absence of the control signal, in a manual mode, in which said blocking member exposes said keyhole and said electric lock is manually operable to lock and unlock said door panel,
wherein said control module is configured to
further measure each of the mains electricity and the electrical energy stored in said electrical energy storage module,
generate the control signal when one of measurements respectively of the electricity output, the mains electricity and electrical energy is greater than the threshold value,
control said electrical energy storage module to store the electricity output from said solar energy module as the electrical energy when the measurement of the electricity output is greater than the threshold value, and
control said electrical energy storage module to store the mains electricity as the electrical energy when the measurement of the electricity output is smaller than the threshold value and the measurement of the mains electricity is greater than the threshold value.

2. The door as claimed in claim 1, wherein said electric lock device further includes:
a transceiver module electrically coupled to said control module and configured to communicate with a remote device; and
an input module disposed at said one of said sides of said door panel, electrically coupled to said control module, and configured to receive a verification input signal indicative of an input code and to transmit the verification input signal to said control module,
wherein said control module is configured, in response to receipt of the conforming signal, to generate a verification code, to transmit the verification code to the remote device through said transceiver module, to determine whether the input code indicated by the verification signal received from said input module conforms with the verification code, and to generate the unlocking signal when the input code conforms with the verification code.

3. The door as claimed in claim 2, wherein said control module is configured to generate the verification code according to one of the measurement of the electricity output of said solar energy module, a first parameter relative to the biometric feature, current time, a second parameter relative to the set of pre-established data, and a combination thereof.

4. The door as claimed in claim 1, wherein said electric lock device further include:
a transceiver module electrically coupled to said control module and configured to communicate with a remote device; and
a sensor module electrically coupled to said control module, and configured to measure a force applied on said electric lock, and to transmit a degree of the force to said control module,
wherein said control module is further configured to determine whether the degree of the force is greater than a threshold degree, to generate a warning signal when it is determined that the degree of the force is greater than the threshold degree, and to transmit the warning signal to the remote device through said transceiver module.

5. The door as claimed in claim 1, wherein said electric lock device further includes a transceiver module electrically coupled to said control module and configured to communicate with a remote device,
wherein said control module is configured to further generate a warning signal and to transmit the warning signal to the remote device through said transceiver module when each of the measurements respectively of the electricity output, the mains electricity and the electrical energy is smaller than the threshold value.

6. The door as claimed in claim 1, wherein said electric lock device further includes:
a transceiver module electrically coupled to said control module and configured to communicate with a remote device;

an input module disposed at said one of said sides of said door panel, electrically coupled to said control module, and configured to receive a verification input signal indicative of an input code and to transmit the verification input signal to said control module; and a sensor module electrically coupled to said control module, and configured to measure a force applied on said electric lock, and to transmit a degree of the force to said control module, wherein said control module is further configured to generate a first warning signal, and transmit the first warning signal to the remote device through said transceiver module when each of the measurements respectively of the electricity output, the mains electricity and the electrical energy is smaller than the threshold value, in response to receipt of the conforming signal, further generate a verification code, transmit the verification code to the remote device through said transceiver module, determine whether the input code indicated by the verification signal received from said input module conforms with the verification code, and generate the unlocking signal when the input code conforms with the verification code, and determine whether the degree of the force is greater than a threshold degree, generate a second warning signal when it is determined that the degree of the force is greater than the threshold degree, and transmit the second warning signal to the remote device through said transceiver module, wherein said transceiver module supports one of Bluetooth®, Wi-Fi, the third generation of mobile telecommunications technology (3G), and the fourth generation of mobile telecommunications technology (4G).

7. The door as claimed in claim 1, wherein said electric lock device further includes a charging module electrically coupled to said control module and allowing an electric device to be electrically connected thereto, and said control module is further configured to determine whether the measurement of the electrical energy stored in said electrical energy storage module is greater than a predetermined value, and to provide the electrical energy from said electrical energy storage module to said charging module for charging the electric device when it is determined that the measurement of the electrical enemy is greater than the predetermined value.

8. The door as claimed in claim 1, wherein said biometric verification module is one of a fingerprint reader and a facial recognition device, and the set of pre-established data is relative to one of a set of fingerprint features and a set of facial features.

9. The door as claimed in claim 1, wherein said electric lock device further includes a transceiver module electrically coupled to said control module and configured to communicate with a remote device, and said control module is further configured to monitor operation status of said solar energy module and to transmit the operation status of said solar energy module to the remote device through said transceiver module.

10. An electric lock device configured to be mounted to a door panel that has two opposite sides, said electric lock device comprising:

a solar energy module adapted to be disposed at one of the sides of the door panel, and configured to convert solar energy into an electricity output;

a biometric verification module adapted to be disposed at said one of the sides of the door panel, and configured to receive a biometric input signal relative to a biometric feature, to determine whether the biometric feature conforms with a set of pre-established data, and to generate a conforming signal when it is determined that the biometric feature conforms with the set of pre-established data;

a control module electrically coupled to said solar energy module and said biometric verification module, and configured to measure the electricity output from said solar energy module, to receive the conforming signal from said biometric verification module, and to generate a control signal when a measurement of the electricity output is greater than a threshold value, said control module being capable of generating an unlocking signal according to the conforming signal;

an electrical energy storage module electrically coupled to said solar energy module and said control module, and configured to store electrical energy from one of mains electricity and the electricity output of said solar energy module, and to provide the electrical energy stored therein as an electrical power source of said electric lock device; and an electric lock having a keyhole and a blocking member that are adapted to be disposed at said one of the sides of the door panel, and electrically coupled to said control module for receiving the control signal and the unlocking signal, said electric lock being configured to operate, in response to receipt of the control signal, in an electric control mode, in which said blocking member covers said keyhole and said electric lock operates to unlock the door panel when receiving the unlocking signal, and operate, in response to the absence of the control signal, in a manual mode, in which said blocking member exposes said keyhole and said electric lock is manually operable to lock and unlock the door panel, wherein said control module is configured to further measure each of the mains electricity and the electrical energy stored in said electrical energy storage module, generate the control signal when one of measurements respectively of the electricity output, the mains electricity and electrical energy is greater than the threshold value, control said electrical energy storage module to store the electricity output from said solar energy module as the electrical energy when the measurement of the electricity output is greater than the threshold value, and control said electrical energy storage module to store the mains electricity as the electrical energy when the measurement of the electricity output is smaller than the threshold value and the measurement of the mains electricity is greater than the threshold value.

11. The electric lock device as claimed in claim 10, further comprising:

a transceiver module electrically coupled to said control module and configured to communicate with a remote device; and an input module adapted to be disposed at said one of the sides of the door panel, electrically coupled to said control module, and configured to receive a verification input signal indicative of an input code and to transmit the verification input signal to said control module, wherein said control module is configured, in response to receipt of the conforming signal, to further generate a verification code, to transmit the verification code to the remote device through said transceiver module, to determine whether the input code indicated by the verification signal received from said input module conforms with the verification code, and to generate the unlocking signal when the input code conforms with the verification code.

12. The electric lock device as claimed in claim 11, wherein said control module is configured to generate the verification code according to one of the measurement of the electricity output of said solar energy module, a first parameter relative to the biometric feature in the biometric input signal, current time, a second parameter relative to the set of pre-established data, and a combination thereof.

13. The electric lock device as claimed in claim 10, further comprising:
   a transceiver module electrically coupled to said control module and configured to communicate with a remote device; and
   a sensor module electrically coupled to said control module, and configured to measure a force applied on said electric lock, and to transmit a degree of the force to said control module,
   wherein said control module is further configured to determine whether the degree of the force is greater than a threshold degree, to generate a warning signal when it is determined that the degree of the force is greater than the threshold degree, and to transmit the warning signal to the remote device through said transceiver module.

14. The electric lock device as claimed in claim 10, further comprising a transceiver module electrically coupled to said control module and configured to communicate with a remote device,
   wherein said control module is configured to further generate a warning signal and to transmit the warning signal to the remote device through said transceiver module when each of the measurements respectively of the electricity output, the mains electricity and the electrical energy is smaller than the threshold value.

15. The electric lock device as claimed in claim 10, further comprising:
   a transceiver module electrically coupled to said control module and configured to communicate with a remote device;
   an input module adapted to be disposed at said one of the sides of the door panel, electrically coupled to said control module, and configured to receive a verification input signal indicative of an input code and to transmit the verification input signal to said control module; and
   a sensor module electrically coupled to said control module, and configured to measure a force applied on said electric lock, and to transmit a degree of the force to said control module,
   wherein said control module is further configured to
      generate a first warning signal, and transmit the first warning signal to the remote device through said transceiver module when each of the measurements respectively of the electricity output, the mains electricity and the electrical energy is smaller than the threshold value,
      in response to receipt of the conforming signal, further generate a verification code, transmit the verification code to the remote device through said transceiver module, determine whether the input code indicated by the verification signal received from said input module conforms with the verification code, and generate the unlocking signal when the input code conforms with the verification code, and
      determine whether the degree of the force is greater than a threshold degree, generate a second warning signal when it is determined that the degree of the force is greater than the threshold degree, and transmit the second warning signal to the remote device through said transceiver module,
   wherein said transceiver module supports one of Bluetooth®, Wi-Fi, 3G and 4G.

16. The electric lock device as claimed in claim 10, wherein said electric lock device further includes a charging module electrically coupled to said control module and allowing an electric device to be electrically connected thereto, and said control module is further configured to determine whether the electrical energy stored in said electrical energy storage module is greater than a predetermined value, and to provide the electrical energy from said electrical energy storage module to said charging module for charging the electric device.

17. The electric lock device as claimed in claim 10, wherein said biometric verification module is one of a fingerprint reader and a facial recognition device, and the set of pre-established data is relative to one of a set of fingerprint features and a set of facial features.

18. The electric lock device as claimed in claim 10, wherein said electric lock device further includes a transceiver module electrically coupled to said control module and configured to communicate with a remote device, and said control module is further configured to monitor operation status of said solar energy module and to transmit the operation status of said solar energy module to the remote device through said transceiver module.

* * * * *